Nov. 1, 1932.   L. A. ELLIS   1,885,809
APPARATUS FOR HANDLING TIRES
Filed May 29, 1929
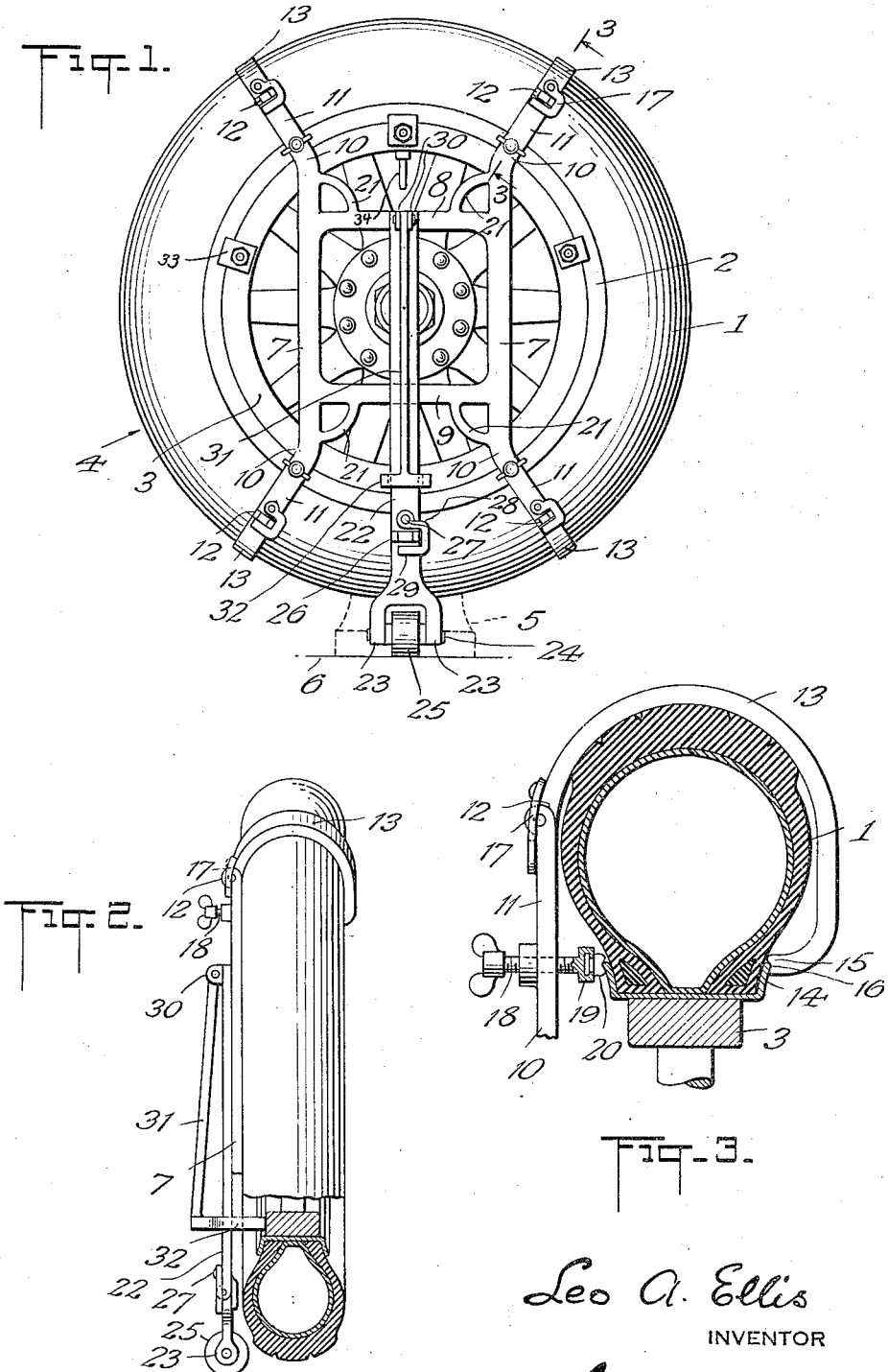
Leo A. Ellis
INVENTOR
BY Seward Davis
ATTORNEY Patented Nov. 1, 1932

1,885,809

UNITED STATES PATENT OFFICE

LEO A. ELLIS, OF BROOKLYN, NEW YORK

APPARATUS FOR HANDLING TIRES

Application filed May 29, 1929. Serial No. 366,917.

My invention relates to an apparatus for dismounting an automobile tire and its rim as a unit from the vehicle wheel, and for transporting same.

My invention has for its general objects the provision of means whereby an automobile tire and the demountable rim holding same may be removed from the wheel without the use of any tool other than the apparatus itself, and may be handled and transported without lifting or carrying the tire and rim.

The foregoing objects are attained by the structural embodiment of my invention shown in the drawing forming a part of this specification as the preferred form thereof, in which drawing Figure 1 is a perspective view in elevation of my device applied to a tire; Figure 2 is a like side view of same, the tire being partly broken away to show a section; and Figure 3 is an enlarged sectional view, taken on the line 3—3 of Figure 1, looking in the direction indicated by arrows.

Like reference characters indicate like parts in these figures, in which 1 is a tire, 2 the rim supporting same upon the felly 3 of a wheel 4, supported from the ground by a jack 5, of usual form, from the ground level, 6. A quadrilateral metal frame having the vertical sides 7, 7 and the horizontal members 8, 9, is shown in Figure 1 as applied from the outer side of a wheel carrying a tire. The sides 7, 7 extend above and below the members 8, 9 to points 10 opposite the wheel felly. At these points, the sides extend angularly outward on radial lines toward the circumference of the tire to form the arms 11. At its extremity, each arm has a hinge 12 connecting it to a curved member 13 which extends around and embraces the tire-tread, and then extends vertically downward to the level of the bead-retaining flange 14 upon the tire-rim, and which then bends inward to form the fingers 15 which in turn support the edge of the rim flange with which they are adapted to engage by the notches 16. Across each hinge 12 extends a bridge-piece 17 pivoted to the arm 11, each piece 17 being adapted to extend across the hinge and prevent the member 13 from swinging away from the tire when thus positioned. The arms 11 are each tapped to receive a threaded bolt 18 whose inner end terminates in the hollow boss 19 holding the shank of the clamp 20 and allowing the bolt 18 to turn on its axis with reference to 20. Each clamp 20 has a notch to engage the edge of the rim flange as shown in Fig. 3.

The horizontal members 8, 9 are each connected by curved braces 21, 21 to the extensions of the sides 7, 7 to form hand-holds, for purposes hereinafter explained. The members 8, 9 are connected at their centers by a bar 22 which extends downward beyond the circumference of the tire and is branched to form bearings 23, 23 for the axle 24 of a roller 25. The bar 22 is hinged at 26 to permit it to be folded when not in use, and is provided with a keeper pivoted at 27 to the bar. The keeper has two arms, 28, 29, adapted to embrace the bar and extend across the hinge to maintain it rigidly in vertical alignment when supporting the weight of a tire.

At the upper end of the bar 22 are lugs 30 to which is pivoted a swinging striker 31, having the horizontal head 32, which is forked so as to swing and strike the felly on both sides of the bar.

The method of operation of my device is as follows: When a tire is to be removed, the wheel is jacked up and my device is applied to the tire by swinging back the members 13, applying the arms 11 to the tire, and then swinging the arms 13 back over the tire. The notches 16 on the fingers 15 are adjusted to the edge of the flange 14 and the bridge pieces 17 are extended to lock the hinge against opening. The bolts 18 are then screwed in, the notches in the clamp 20 adjusted to the rim flange 14, and the bolts then tightened. The frame is thus clamped to the rim and embraces the tire. The roller 25 on the bar 22 is then lowered and the hinge 26 is locked by the keeper 27.

The rim having been freed from the keepers 33 holding it on the felly, the head of the striker 31 is driven sharply against the felly while a pull is exerted upon the lower pair of curved braces 21, which serve as hand-holds. When the rim is loosened on the felly, it is pulled forward until freed therefrom. By then lifting upon the upper pair of braces 21, the rim is retracted from the valve-stem 34, when the rim and tire may be trundled on the roller 25.

By my device the labor of handling a tire in the process of changing and of lifting of the tire and rim is much reduced. Rolling my device as a carrier for the tire saves the hands and clothes from the dirt that results from handling and rolling a muddy tire on its periphery and enables the operation to be completed with comparative cleanliness, as well as with comparative ease.

Having thus described my invention, I claim:

1. A tire handling device comprising a substantially vertical frame having a supporting roller at its lower end, and means for rigidly clamping the upper and lower end portions of the frame to a vehicle tire and to its rim, said means engaging said rim on its edges at opposite sides thereof and at a plurality of pairs of points opposite each other.

2. A tire handling device comprising a substantially vertical frame, a supporting roller at its lower end, clamping devices at the upper and lower end portions of the frame for rigidly clamping a tire and its rim to said frame, each of said clamping devices comprising a hook-shaped member pivotally connected to the frame, the outer end of said member being adapted to engage the opposite edge of the rim, and means for locking the pivoted member against pivotal movement in one direction relatively to the frame.

3. A device for assisting in the removal of a vehicle wheel rim and tire mounted thereon from its wheel, comprising a substantially vertical frame, means for rigidly clamping the upper and lower end portions of said frame to the tire and its rim, said means including members adapted to extend transversely around said tire and to engage the remote flange of said rim along its edge, and upper and lower handle members united with the frame.

4. A device for assisting in the removal of a vehicle wheel rim and tire mounted thereon from its wheel, comprising a substantially vertical frame, means for clamping the upper and lower end portions of said frame to the rim, said means including members adapted to extend transversely around said tire and to engage the remote side of said rim along its flange, a supporting roller at the lower end of said frame, the portion of the frame that is united with the roller being pivotally connected to the main portion of the frame for folding purposes, and means for locking the pivoted portions to prevent the same from folding when the device is in use.

5. A device for dismounting a tire and its rim from a wheel and for handling same consisting of a substantially vertical frame having side members, horizontal members therebetween, arms extending from the extremities of each of said side members adapted to embrace a tire and to engage the edge of one flange of a tire rim with their extremities, each side member having a bolt threaded through it at a point opposite the other flange of said tire rim, and means carried by said bolt adapted to engage the edge of the last mentioned flange, whereby tightening said bolt clamps the rim between each bolt and the extremity of the arm opposite it, a bar arranged between said side members and extending from said horizontal members parallel to said side members and adapted to project beyond the circumference of the tire, said bar having a roller journaled therein at its outer extremity, whereby the device and a tire held thereby may be supported from the ground.

LEO A. ELLIS.